March 22, 1966     J. S. ZUCKERBRAUN     3,242,344
WIDE FIELD SCANNING MECHANISM WITH TWO PLURALITIES OF SCANNING
APERTURES PERPENDICULAR TO EACH OTHER
Filed Dec. 11, 1961
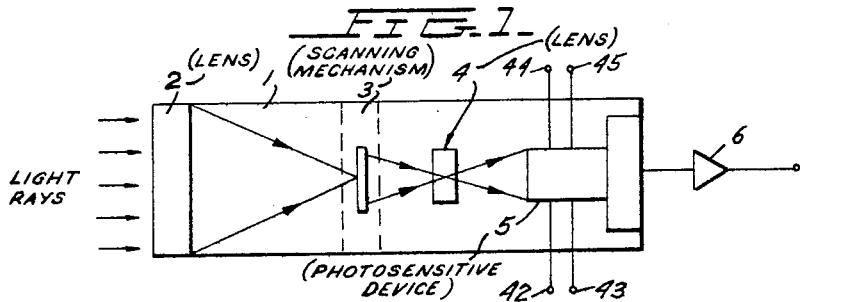
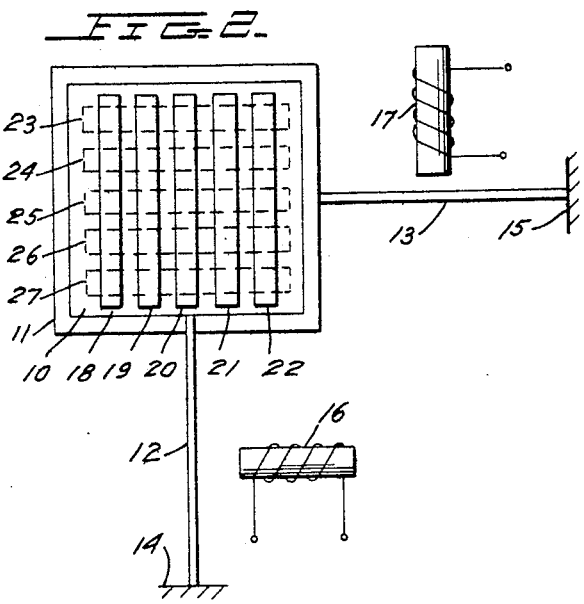
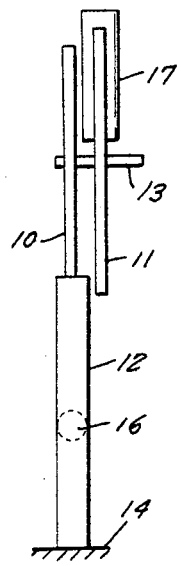
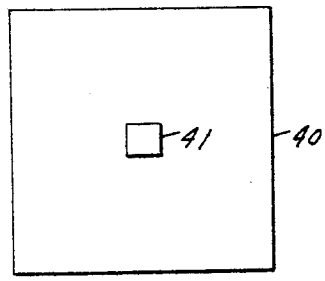
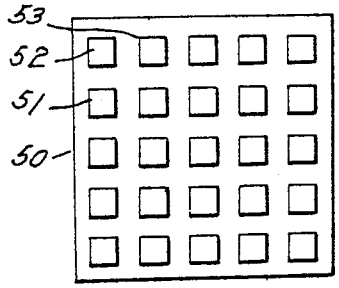
INVENTOR.
JACOB S. ZUCKERBRAUN
BY
Ostrolenk, Faber, Gerb & Soffen
ATTORNEYS

United States Patent Office 3,242,344
Patented Mar. 22, 1966

3,242,344
WIDE FIELD SCANNING MECHANISM WITH TWO PLURALITIES OF SCANNING APERTURES PERPENDICULAR TO EACH OTHER
Jacob S. Zuckerbraun, New York, N.Y., assignor to Kollsman Instrument Corporation, Elmhurst, N.Y., a corporation of New York
Filed Dec. 11, 1961, Ser. No. 158,337
3 Claims. (Cl. 250—232)

This invention relates to a scanning mechanism for light source tracking devices, and more specifically relates to a scanning mechanism usable in the daylight which has a exceptionally wide field of view.

Scanning systems of the type to which the invention is directed have been set forth in my copending application Serial No. 47,837, filed August 8, 1960, entitled "Light Modulation System," assigned to the assignee of the present invention.

In such scanning mechanisms, where high tracking accuracy is desired, the field of view of the device necessarily becomes relatively small.

The principle of the present invention is to provide a matrix of vibrating apertures wherein the total matrix encompasses a very large field of view. The matrix cooperates with one or more elemental photosensitive areas having an area equal to the area of any one of the plurality of apertures defined in the matrix of apertures.

By way of example, the matrix of apertures may cooperate with a photosensing device such as an image dissector tube which is a photomultiplier which has a small sensitive area which can be positioned in a plane by means of a control electric or magnetic field. Light falling upon this sensitive spot will produce a photo current, while light falling upon any other portion of the photocathode of the tube produces a zero output.

The size of the dynamic field swept by any of the plurality of apertures in the matrix of apertures is then made equal to the size of the cathode spot. Thus, the matrix of apertures can be set into vibration and, by knowing the position of the sensitive spot in the photomultiplier which is a known position, and by knowing the optical axis of the telescope being used, one can determine which of the apertures in the matrix of apertures is being used to modulate the image of the light source being tracked.

Accordingly, a mechanical search pattern is not needed to first locate the star before scanning can proceed so long as the image of the star is modulated by any of the apertures in the matrix of apertures. Thus, the device has an exceptionally large field of view.

As a second embodiment of the invention, and instead of having a photosensing device with a single sensitive spot, it is also possible to provide a photosensing device which is of the channeled mosaic photomultiplier type. Such tubes provide, in a plane, a mosaic of individual photomultiplier elements, each having a separate output terminal. When using this type of photosensing element with the matrix of oscillating apertures, by knowing the optical axis of the telescope and the particular element being energized, one immediately can determine the position of the light source with respect to the telescope using this photosensitive spot in the mosaic of elements as the output element. Thus, again, an exceptionally wide field of view results.

Accordingly, a primary object of this invention is to provide a wide field tracking mechanism.

Another object of this invention is to provide a wide field tracking mechanism for use in daylight which includes a matrix of vibrating apertures.

A further object of this invention is to provide a novel tracking mechanism which includes a matrix of vibrating apertures for use with star tracking.

A further object of this invention is to provide a novel combination of a matrix of vibrating apertures and an identifiable photosensitive location over a relatively wide area in a photosensing device for providing a wide field light source tracking device.

These and other objects of this invention will become apparent from the following description when taken in connection with the drawings, in which:

FIGURE 1 shows a schematic view of the telescope of the invention.

FIGURE 2 illustrates the vibrating matrix of apertures formed by magnetically driven reeds which mount slot-containing plates perpendicular to one another.

FIGURE 3 is a side view of FIGURE 2.

FIGURE 4 illustrates the photo-cathode of an image dissector tube having a small sensitive area therein.

FIGURE 5 illustrates the photocathode of a channeled mosaic photomultiplier.

Referring now to FIGURE 1, I have illustrated therein a telescope housing 1 which contains an objective lens system 2 which focuses incident radiation from a light source to be tracked upon scanning plates contained within a scanning mechanism 3. As will be discussed more fully hereinafter, the scanning mechanism 3 modulates the image of the light source being tracked, and this scanned image is focused by imaging lens system 4 upon a photosensitive device 5. The output of the photosensitive device 5 is then amplified in an amplifier 6, and thereafter the output is connected to appropriate control circuitry which utilizes the information obtained by the scanning system and would include, for example, a servo mechanism which continues to aim telescope 1 toward the source being tracked. Details of this circuitry are not needed here, as it is well known to those skilled in the art.

The scanning mechanism 3, in accordance with the present invention, is formed of a matrix of oscillating apertures. In FIGURE 2, the scanning system 3 can be formed by two plates 10 and 11 which are carried at the ends of magnetic reeds 12 and 13 respectively. The reeds 12 and 13 respectively are secured at their other ends 14 and 15, for example, to the telescope housing.

A solenoid drive coil 16 and 17 is then provided for reeds 12 and 13 respectively where these coils are connected to a source of alternating current of an appropriate frequency to oscillate their respective reeds in the manner taught in my above noted application Serial No. 47,837.

It is to be noted that the plates 10 and 11 could also be carried from any other type of drive system such as the drive system set forth in my copending application Serial No. 71,248, filed November 23, 1960, entitled "Photosensitive Tuning Fork Scanner," now Patent No. 3,178,579, which is assigned to the assignee of the present invention.

Whereas the plates 10 and 11 in the prior art contain single perpendicularly disposed slots, in accordance with the present invention, each of the plates contain a plurality of parallel slots where the slots of one plate are disposed perpendicularly with respect to the slots of the other plates. Thus, the plate 10 has five vertical slots 18, 19, 20, 21 and 22, while plate 11 contains five horizontal slots 23, 24, 25, 26 and 27. These slots could, for example, be formed through the formation of appropriate opaque regions on a transparent body.

When the plates are placed together in close proximity with one another, as shown in FIGURE 3, it is clear that they define a matrix of small apertures formed at the intersections of the clear spaces or slots. In the embodiment of FIGURES 1 and 2, twenty-five such apertures will be formed.

The size of each aperture, as defined by the width of the clear areas, is, in the case of star tracking, made equal to the star image diameter, to thereby obtain a maximum photon signal-to-noise ratio. In this regard, each of the twenty-five apertures defined in FIGURES 2 and 3 are the equivalent of the single aperture previously defined by the scanning mechanism.

In accordance with a first embodiment of the present invention, the photosensing device 5 may be formed of an image dissector tube. For purposes of the invention, it is convenient to think of the photosensing device 5, when formed of an image dissector tube to act as a photomultiplier having a small sensitive area which can be positioned by means of an electric or magnetic field. In actuality, an image dissector includes a photo-cathode which forms an electron image of the field of view. This electron image is then focused by a uniform field into the plane of an aperture in front of a photomultiplier. Deflecting fields then move the electron image with respect to the aperture so that the output of the photomultiplier is similar to that obtained if the light image itself were oscillated with respect to the aperture.

In FIGURE 4, I have shown the photocathode of the tube 5 which is an extended photo-cathode area 40 which has, in effect, a small sensitive spot 41 therein. The size of the sensitive spot is preferably equal to the size of the swept apertures defined by the plates in FIGURES 2 and 3.

The location of sensitive area 41 is also, as pointed out above, adjustable by means of magnetic or electric fields where the adjustment means is schematically illustrated in FIGURE 1 by pairs of terminals 42–43 and 44–45, whereby application of appropriate voltages to these terminals can control the position of sensitive spot 41 anywhere within the cathode region 40.

When light falls upon the sensitive spot 41, a photocurrent is generated in accordance with the intensity of the light, while the remainder of photocathode 40 is insensitive to incident radiation.

When tracking with the above embodiment, the telescope will be first positioned by a computer which roughly computes the position of the desired star so that the star falls within approximately 1° of the field of view. The sensitive spot of the image dissector 5 is thereafter stepped in sequence by any appropriate control circuitry well known to those skilled in the art, until it lies under the aperture most likely to contain the star. Since the position of the cathode spot 41 is known at all times, the aperture which contains the star can, therefore, be easily identified. Once this acquisition occurs, the star is then tracked to a null position of that particular aperture in the usual manner such as that set forth in above noted application Serial No. 47,837. The final read-out of the tracker may then be the sum of the angular position of the optical axis of telescope 1, plus the position of the tracking aperture to provide a servo system with sufficient information to maintain the telescope in proper position.

It is to be noted that the positioning of the cathode spot need not be extremely precise, since tracking accuracy is determined by the vibrating scanning mechanism. The tracker, therefore, combines the flexibility of an electronic search with the high accuracy of the mechanical scanner.

In the second embodiment of the invention, the photosensitive device 5 of FIGURE 1 is replaced by a channeled mosaic photomultiplier. This type of tube has a photo-cathode of the type shown in FIGURE 5, which is formed of a mosaic of photomultiplier elements, each of which has a separate output terminal. Thus, in FIGURE 5 the photocathode 50 is illustrated to have twenty-five photomultiplier elements such as elements 51, 52 and 53. The number of elements in the matrix will, of course, be made equal to the number of apertures defined by the plates 10 and 11 in FIGURE 2. Thus, twenty-five elements are provided in FIGURE 5. The size of each of the cathode elements is made equal to the dynamic field swept out by a single aperture. The actual number of photosensitive spots and corresponding apertures will depend upon the desired field size to be swept.

Once the telescope 1 has been pointed toward the light source to be tracked, and, depending upon where the light source is within the field, a particular aperture and photomultiplier element in the matrix of elements in FIGURE 5 will be energized. This will, therefore, considerably reduce the acquisition time for the entire field.

The size of each of the tracking elements may correspond, for example, to a six minute field, which, for the twenty-five elements, will result in a ½° x ½° composite field of view.

When tracking with the device of FIGURE 5, the telescope is first roughly oriented by means of a computer to locate the star to be tracked somewhere within the tracking field. The azimuth aperture is then put into oscillation to thereby modulate the star flux. That is to say, plate 11, for example, can be placed in vibration, while plate 10 is maintained constant.

A sampling switch may then interrogate the output of each of the elements of FIGURE 5 and stop at the one having some signal. This identifies the particular aperture which modulates the star light. Thereafter, an azimuth servo system may be switched on to permit the telescope to track to the center of the aperture oscillation in the usual manner such as that set forth in my copending application Serial No. 47,837.

After the azimuth tracking is completed, the altitude reed is brought into oscillation, and the azimuth reed is stopped. That is to say, plate 10 is placed in vibration, while plate 11 is stationary. Thus, tracking will occur in a direction perpendicular to the previous tracking.

The altitude tracking then continues as mentioned above for the case of azimuth tracking, whereby the final output indication of the tracker will be the sum of the aperture coordinates within the matrix and the corresponding coordinates of the optical axis of the telescope of FIGURE 1.

In the event that only a few elements are used in the matrix of FIGURE 2, it may be possible to use a beam splitting technique such as that set forth in my copending application Serial No. 77,198, filed December 20, 1960, entitled "Scanning Device for Light Tracking Systems" and assigned to the assignee of the present invention (and now abandoned). This would provide for continuous tracking in both altitude and azimuth, and avoid the need for time shared operation where there is tracking first in altitude and thereafter in azimuth.

Moreover, the two axes scheme of copending application, Serial No. 158,335 entitled "Two-Axes Reed Scanner," can also be applied.

It is to be noted that the use of this type of system can be applied to daylight star trackers of high accuracy within the order of seconds of arc with acquisition times of about 1 second with relatively large fields of view.

Although this invention has been described with respect to its preferred embodiments it should be understood that many variations and modifications will now be obvious to those skilled in the art, and it is preferred, therefore, that the scope of this invention be limited not by the specific disclosure herein but only by the appended claims.

What is claimed is:

1. A light tracking device having a wide field of view; said light tracking device including a scanning mechanism for scanning the image of a light source and a photosensing means for receiving the light which passes through said scanning means; said scanning mechanism including a plurality of scanning apertures in the plane of the image of said light source; said plurality of scanning apertures being formed of a first plurality of slots and a second plurality of slots; said first and second plurality of slots in parallel contiguous relationship; said second plurality of slots being perpendicular to said first plurality of slots; said first plurality of slots being oscillated with respect to said second plurality of slots to cause said apertures to scan; said first and second plurality of slots being elongated rectangles substantially perpendicular to one another.

2. The device of claim 1 wherein said photosensing device includes a photosensitive area for each of said plurality of scanning apertures.

3. A light tracking device having a wide field of view; said light tracking device including a scanning mechanism for scanning the image of a light source and a photosensing means for receiving the light which passes through said scanning means; said scanning mechanism including a plurality of scanning apertures in the plane of the image of said light source; said photosensing device including at least a single photosensitive area for cooperation with said plurality of scanning apertures; said plurality of scanning apertures being formed of a first plurality of slots and a second plurality of slots; said first and second plurality of slots in parallel contiguous relationship; said second plurality of slots being perpendicular to said first plurality of slots; said first plurality of slots being oscillated with respect to said second plurality of slots to cause said apertures to scan; said first and second plurality of slots being elongated rectangles substantially perpendicular to one another.

References Cited by the Examiner
UNITED STATES PATENTS

| | | | |
|---|---|---|---|
| 1,951,666 | 3/1934 | Martin | 250—232 X |
| 2,000,948 | 5/1935 | Hayes | 250—232 X |
| 2,398,552 | 4/1946 | Norton | 250—237 X |
| 2,720,810 | 10/1955 | Senn | 250—237 |
| 2,923,202 | 2/1960 | Trimble | 250—203 X |
| 3,149,235 | 9/1964 | Clark | 250—203 |

RALPH G. NILSON, *Primary Examiner.*

WALTER STOLWEIN, *Examiner.*